(12) United States Patent
Chou et al.

(10) Patent No.: US 9,138,935 B2
(45) Date of Patent: Sep. 22, 2015

(54) PROCESS FOR PRODUCING AN ANTISTATIC YARN

(71) Applicant: Acelon Chemicals & Fiber Corporation, Changhua Hsien (TW)

(72) Inventors: Wen-Tung Chou, Changhua (TW); Ming-Yi Lai, Changhua (TW); Kun-Shan Huang, Tainan (TW); Hsiao-Chi Tsai, Pingtung (TW); Chien-Yuan Wang, Taichung (TW)

(73) Assignee: Acelon Chemicals & Fiber Corporation, Changhua Hsien (TW)

( * ) Notice: Subject to any disclaimer, the term of this patent is extended or adjusted under 35 U.S.C. 154(b) by 401 days.

(21) Appl. No.: 13/748,804

(22) Filed: Jan. 24, 2013

(65) Prior Publication Data

US 2013/0313750 A1 Nov. 28, 2013

(30) Foreign Application Priority Data

May 22, 2012 (TW) .............................. 101118167 A

(51) Int. Cl.
*D01F 1/09* (2006.01)
*D02J 1/22* (2006.01)
(Continued)

(52) U.S. Cl.
CPC ............... *B29C 51/004* (2013.01); *B29C 55/04* (2013.01); *D01D 5/098* (2013.01); *D01D 5/16* (2013.01);
(Continued)

(58) Field of Classification Search
CPC .......... D01D 5/098; D01D 5/12; D01D 5/16; D01D 5/22; D01D 5/30; D01D 5/32; D01D 5/34; D01D 5/36; D01F 1/09; D02G 1/004; D02G 1/02; D02G 1/0206; D02G 1/0213; D02G 1/022; D02G 1/20; D02G 1/205; D02G 3/441; D02J 1/22; D02J 1/229
USPC ............... 264/103, 105, 168, 172.11, 172.13, 264/172.14, 172.15, 172.17, 172.18, 210.1, 264/210.2, 210.5, 210.6, 210.8, 288.4, 264/290.5, 290.7, 342 RE
See application file for complete search history.

(56) References Cited

U.S. PATENT DOCUMENTS 4,051,287 A * 9/1977 Hayashi et al. ...... 264/172.14 X
7,074,482 B1 * 7/2006 Nishimura et al. ........... 428/364
(Continued)

FOREIGN PATENT DOCUMENTS

CN 1531608 X 9/2004
CN 101168861 A 4/2008
(Continued)

OTHER PUBLICATIONS

Search Report issued in CN Application No. 2012101799686, dated Dec. 18, 2014, 6 pages.
(Continued)

*Primary Examiner* — Leo B Tentoni
(74) *Attorney, Agent, or Firm* — Fish & Richardson P.C.

(57) ABSTRACT

A process for producing an antistatic yarn includes the steps of: (a) providing antistatic composite filaments having carbon black dispersed therein; (b) advancing the antistatic composite filaments to a first heating zone at a first advancing speed which ranges from 230 m/min to 330 m/min; (c) drawing the antistatic composite filaments from the first heating zone to a false twist zone at a second advancing speed such that a draw ratio of the second advancing speed to the first advancing speed ranges from 1.5 to 1.75, thereby obtaining false twisted filaments; and (d) heat-setting the false twisted filaments so as to obtain a permanent antistatic crimped yarn.

12 Claims, 10 Drawing Sheets

(51) Int. Cl.
  *D02G 1/20*    (2006.01)
  *D01D 5/12*    (2006.01)
  *B29C 51/00*   (2006.01)
  *D01D 5/34*    (2006.01)
  *D01D 5/22*    (2006.01)
  *D02G 1/02*    (2006.01)
  *D02G 3/44*    (2006.01)
  *D01D 5/16*    (2006.01)
  *D02G 1/00*    (2006.01)
  *D01D 5/098*   (2006.01)
  *D01D 5/36*    (2006.01)
  *B29C 55/04*   (2006.01)

(52) U.S. Cl.
  CPC .. *D01D 5/22* (2013.01); *D01D 5/34* (2013.01); *D01D 5/36* (2013.01); *D02G 1/004* (2013.01); *D02G 1/02* (2013.01); *D02G 1/022* (2013.01); *D02G 1/0206* (2013.01); *D02G 1/0213* (2013.01); *D02G 1/205* (2013.01); *D02G 3/441* (2013.01); *D02J 1/229* (2013.01)

(56) References Cited

U.S. PATENT DOCUMENTS

2009/0029164 A1*  1/2009  Yoshimoto et al. ........... 428/370
2012/0184166 A1*  7/2012  Kurihara et al. .............. 442/181

FOREIGN PATENT DOCUMENTS

| CN | 101535539 Y | 9/2009 |
| CN | 102031588 A | 4/2011 |
| JP | 2001-172825 A | 6/2001 |
| JP | 200697146 A | 4/2006 |
| WO | 2007046296 A1 | 4/2007 |
| WO | 2008123586 A1 | 10/2008 |
| WO | WO-2011034113 A * | 3/2011 |

OTHER PUBLICATIONS

Search Report issued in corresponding Taiwanese Application No. 101118167, dated Mar. 23, 2015, 1 page plus English Translation.

* cited by examiner

PROCESS FOR PRODUCING AN ANTISTATIC YARN

CROSS-REFERENCE TO RELATED APPLICATION

This application claims priority of Taiwanese application no. 101118167, filed on May 22, 2012.

BACKGROUND OF THE INVENTION

1. Field of the Invention

This invention relates to a process for producing an antistatic yarn, more particularly to a process for producing a permanent antistatic crimped yarn that includes carbon black.

2. Description of the Related Art

Many approaches have been proposed to impart an antistatic property to cloth made of a polymeric yarn, such as a polyester yarn. For example, a fiber yarn for making cloth may be imparted with an antistatic property by adding an antistatic agent to the cloth or the yarn thereby to render the cloth slightly conductive or to render the cloth hydrophilic for adsorbing moisture from the air. Such an antistatic property of the cloth may gradually diminish with repeated laundering of the cloth.

On the other hand, a conductive material (such as carbon black, metal, metal oxide, etc.) may be added to the polymeric yarn for making a permanent antistatic yarn. However, the carbon-black containing polymeric yarn may have a relatively low breaking strength, a relatively low breaking elongation, or a relatively low crimp contraction, so that such a permanent antistatic yarn is merely suitable for plain weaving, and is not suitable for making cloth or fabric with the desired bulkiness, hand, and appearance. The application of the permanent antistatic yarn is thus limited.

FIGS. 1 and 2 show a commercially available cloth or fabric made from an antistatic yarn. The cloth/yarn as shown has a relatively flat surface, and does not have a crimpy or fluffy appearance.

SUMMARY OF THE INVENTION

Therefore, an object of the present invention is to provide a process for producing a permanent antistatic crimped yarn which includes carbon black, and which has a breaking strength greater than 3 g/d, a breaking elongation ranging from 20% to 30%, and a crimp contraction not less than 35%.

According to this invention, a process for producing an antistatic yarn includes the steps of:

(a) providing antistatic composite filaments, each extending in an axial direction and including a conductive matrix portion that is made of a first synthetic polymer material having carbon black dispersed therein, and a non-conductive matrix portion that is made of a second synthetic polymer material, each of the conductive and non-conductive matrix portions extending in the axial direction;

(b) advancing the antistatic composite filaments to a first heating zone having a first heating temperature (T) at a first advancing speed which ranges from 230 m/min to 330 m/min, such that $Tm-T \leq 60°$ C. where Tm is a melting point of the first synthetic polymer material;

(c) drawing the antistatic composite filaments from the first heating zone to a false twist zone at a second advancing speed such that a draw ratio which is a ratio of the second advancing speed to the first advancing speed ranges from 1.5 to 1.75, thereby obtaining false twisted filaments; and (d) advancing the false twisted filaments from the false twist zone to a second heating zone for heat-setting so as to obtain a crimped yarn.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
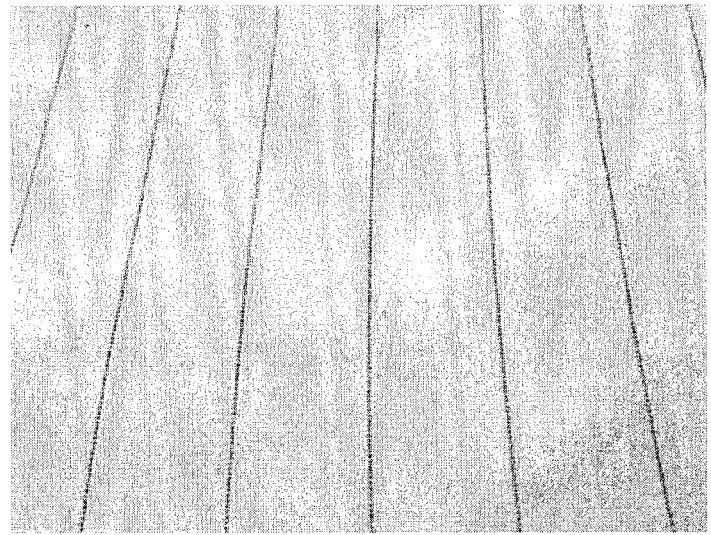
FIGS. 1 and 2 show a commercial available fabric produced from a conventional antistatic yarn.

Before the present invention is described in greater detail, it should be noted herein that like elements are denoted by the same reference numerals throughout the disclosure.

Figure 3:
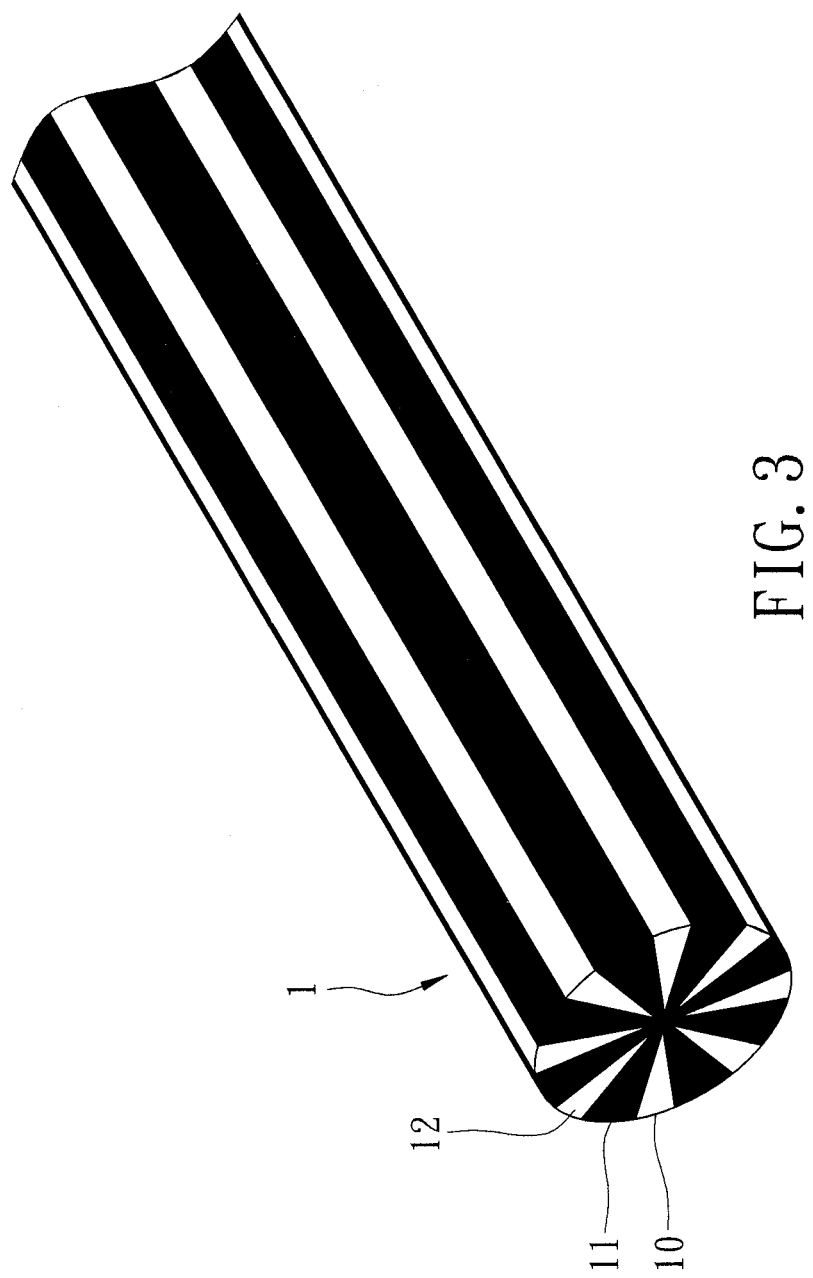
FIG. 3 is a fragmentary perspective view of an antistatic composite filament which is used for producing the preferred embodiment of an antistatic yarn according to this invention.

FIG. 3 shows an antistatic composite filament 1 which is used for producing a permanent antistatic crimped yarn by the process according to a preferred embodiment of this invention. The antistatic composite filament 1 extends in an axial direction 100 (see FIG. 4e) and includes a plurality of conductive matrix portions 11 and a plurality of non-conductive matrix portions 12. Each of the conductive and non-conductive matrix portions 11, 12 extends in the axial direction 100.

Each of the conductive matrix portions 11 is made of a first synthetic polymer material having dispersed therein carbon black in an amount ranges from 10 wt % to 30 wt % based on the weight of the conductive matrix portion 11. Examples of the first synthetic polymer materials are polybutylene terephthalate (PBT), polytrimethylene terephthalate (PTT), polyethylene (PE), polypropylene (PP), polyvinyl chloride (PVC), poly(vinylidene dichloride) (PCDC), and polyacrylonitrile (PAN). The first synthetic polymer material is not limited to the above exemplified polymer materials, and can be any polymer material that has relatively low water content, and that can be endowed with an antistatic property by the addition of carbon black thereto.

Each of the non-conductive matrix portions 12 is made of a second synthetic polymer material. Examples of the second synthetic polymer materials are polyester, polyamide, and polyolefin.

As shown in FIG. 3, each of the conductive matrix portions 11 is exposed from an outer peripheral surface 10. The conductive matrix portions 11 are present in an amount ranging from 20% to 60% by volume of the antistatic composite filament 1.

FIGS. 4a to 4i are cross-sectional views of possible variations of the antistatic composite filament 1 of FIG. 3. As illustrated, the conductive matrix portion 11 and the non-conductive matrix portion 12 may be one or more in number. Moreover, at least one of the conductive matrix portions 11 is disposed adjacent to the outer peripheral surface 10 such that the antistatic property of the antistatic composite filament 1 can be enhanced. The non-conductive matrix portions 12 are provided to reinforce the structure of the antistatic composite filament 1 such that the antistatic composite filaments 1 can have better elasticity and elongation. Besides, referring particularly to FIGS. 4c-4e and 4g to 4i, by distributing the non-conductive matrix portions 12 evenly among the conductive matrix portions 11, the structure of the antistatic composite filament 1 can be further reinforced, and the antistatic composite filament 1 is less likely to break when being subjected to false twisting.

Figure 5:
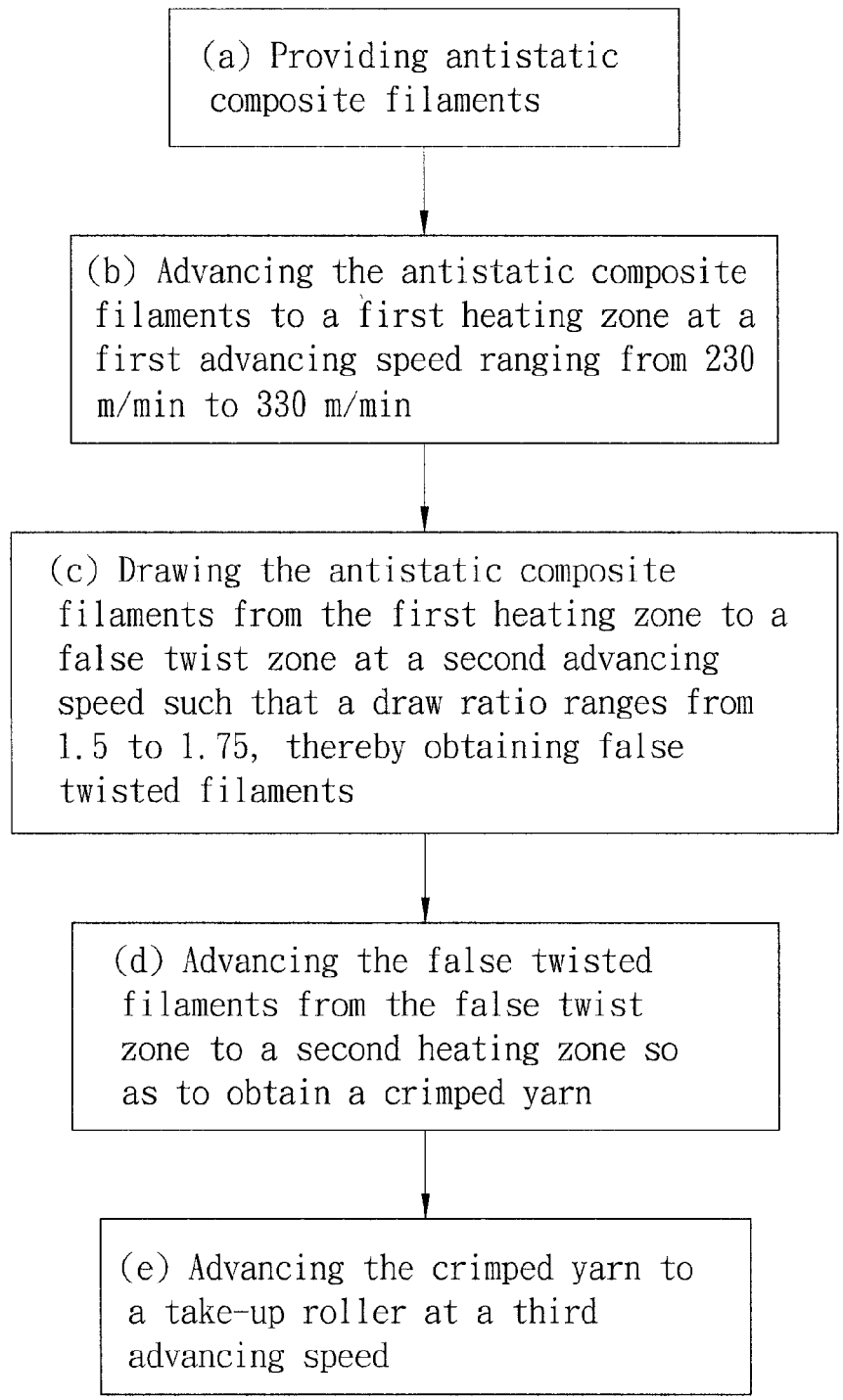
FIG. 5 is a flow chart to illustrate the preferred embodiment of a process for producing an antistatic yarn according to this invention.
Figure 6:
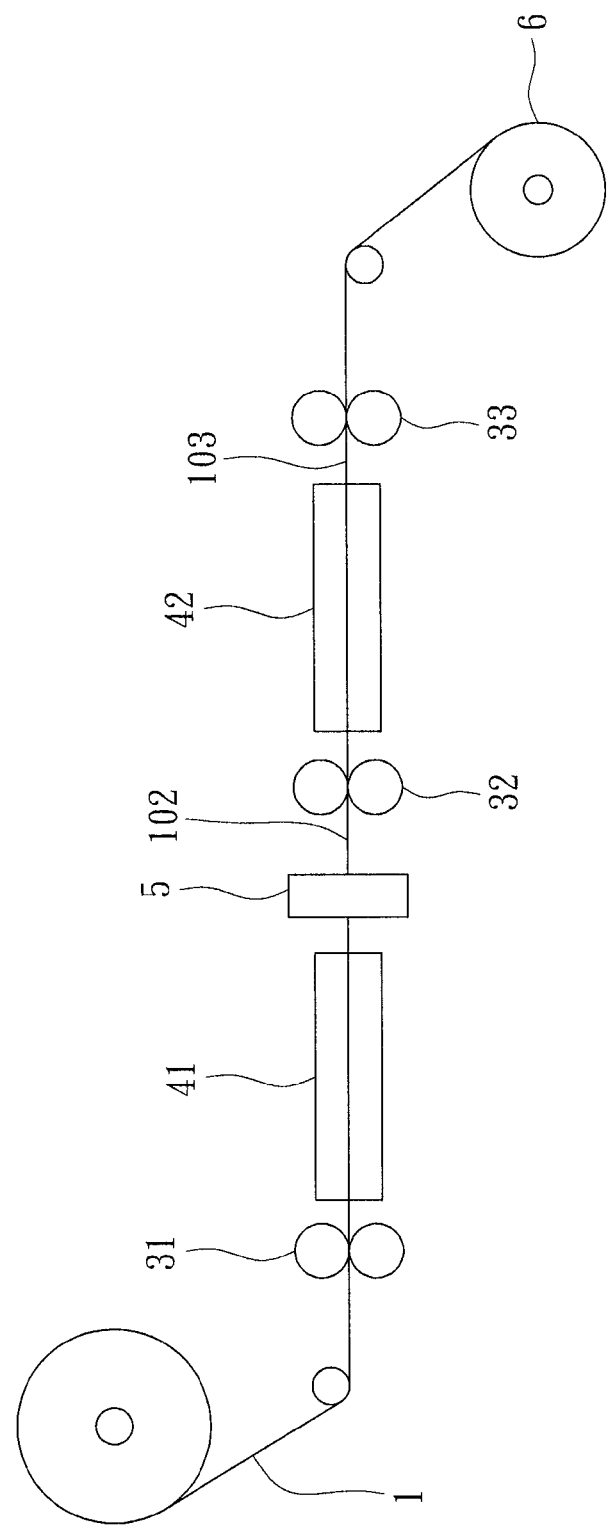
FIG. 6 is a schematic diagram illustrating how the process of FIG. 5 is carried out by means of an apparatus for producing the antistatic yarn.

With reference to FIGS. 5 and 6, the preferred embodiment of a process for producing the permanent antistatic yarn according to this invention includes the following steps (a) to (e).

In step (a), a plurality of the antistatic composite filaments 1 are provided. Preferably, the surface resistivity of the antistatic composite filaments 1 ranges from $10^2$ Ω/square to $10^3$ Ω/square.

In step (b), the antistatic composite filaments 1 are advanced to a first heating zone at a first advancing speed by a first feed unit 31. The first heating zone is provided by a first heating unit 41, and is maintained at a first heating temperature (T) such that $Tm-T \leq 60°$ C. where Tm is a melting point of the first synthetic polymer material. The first heating temperature preferably ranges from 160° C. to 220° C. The first feed unit 31 includes two nip rollers for advancing the antistatic composite filaments 1. The first advancing speed preferably ranges from 230 m/min to 330 m/min. In this step, the antistatic composite filaments 1 are softened so as to be more readily deformable in the subsequent step.

In step (c), the antistatic composite filaments 1 are drawn from the first heating zone to a false twist zone at a second advancing speed by a second feed unit 32 such that a draw ratio which is a ratio of the second advancing speed to the first advancing speed ranges from 1.5 to 1.75, thereby obtaining false twisted filaments 102. The second feed unit 32 includes two nip rollers for drawing the antistatic composite filaments 1. The second advancing speed preferably ranges from 400 m/min to 500 m/min. In the false twist zone provided by a false-twister 5, the antistatic composite filaments 1 which are drawn are twisted at an angle of 100°~105° to obtain deformed filaments and are then untwisted to obtain the false twisted filaments 102. The false-twister 5 can be an air jet false twisting device or a disc false twisting device. In the preferred embodiment, the disc false twisting device is used.

In step (d), the false twisted filaments 102 are continuously advanced at the second advancing speed to a second heating zone for heat-setting and for removing residual torsion in the false twisted filaments 102 so as to obtain the permanent antistatic crimped yarn 103. The second heating zone is provided by a second heating unit 42, and is maintained at a second heating temperature slightly lower than the first heating temperature and preferably ranging from 150° C. to 210° C.

In step (e), the crimped yarn 103 is advanced to a take-up roller 6 at a third advancing speed ranging from 325 m/min to 420 m/min by a third feed unit 33 which includes two nip rollers for advancing. Preferably, the third advancing speed is lower than the second advancing speed, and a draw ratio of the third advancing speed to the second advancing speed is about 0.8.

The crimped yarn 103 made by the process of this invention has a surface resistance ranging from $10^5$ Ω/square to $10^8$ Ω/square, a breaking strength greater than 3 g/d, a breaking elongation ranging from 20% to 30%, and a crimp contraction not less than 35%. The crimped yarn 103 is suitable for producing a fabric with a desired bulkiness, hand and appearance, and thus can have wide applications in various fields.

The present invention will now be explained in more detail below by way of the following examples and comparative examples.

<Sample A1>

Figure 4A:
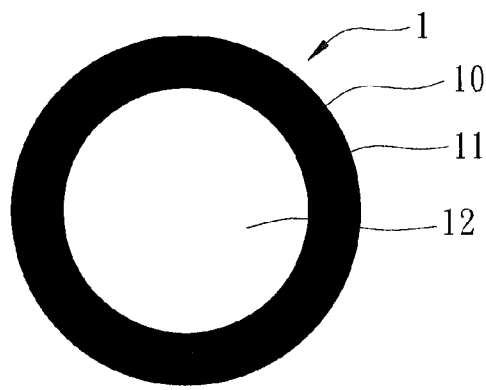
FIGS. 4a to 4i are cross-sectional views of the antistatic composite filament suitable for producing the antistatic yarn according to this invention.
Figure 4B:
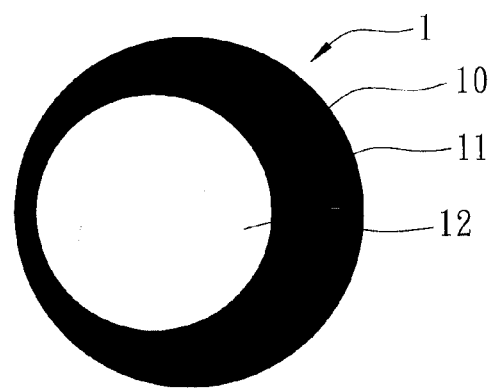
Figure 4C:
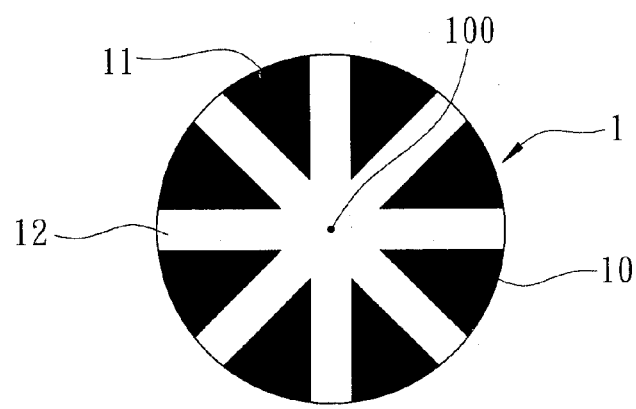
Figure 4D:
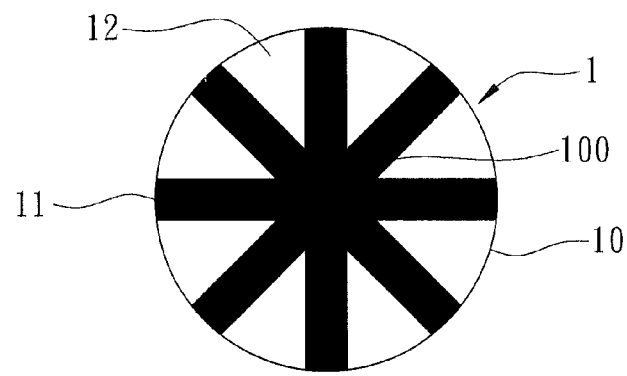
Figure 4E:
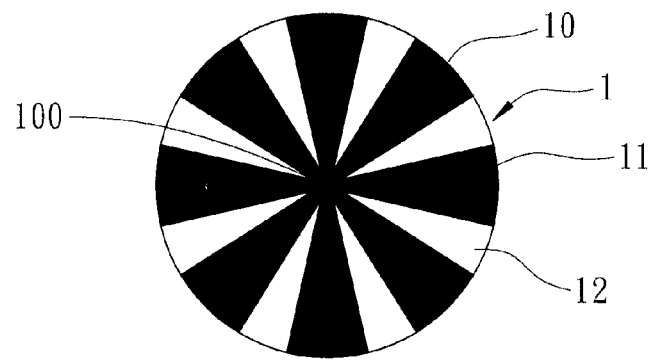
Figure 4F:
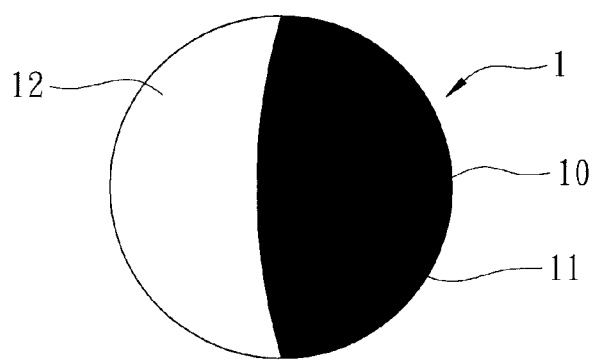
Figure 4G:
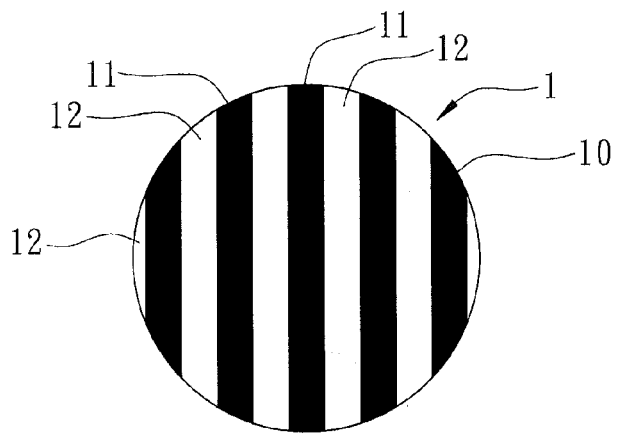
Figure 4H:
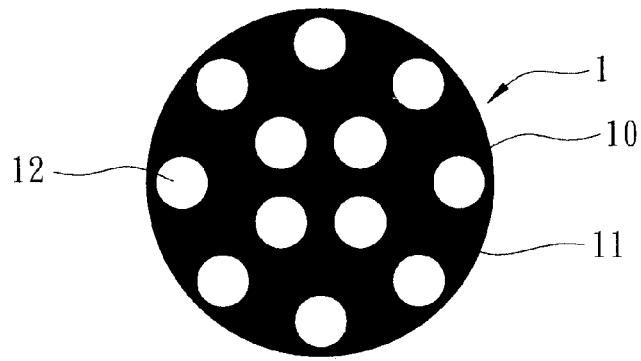
Figure 4I:
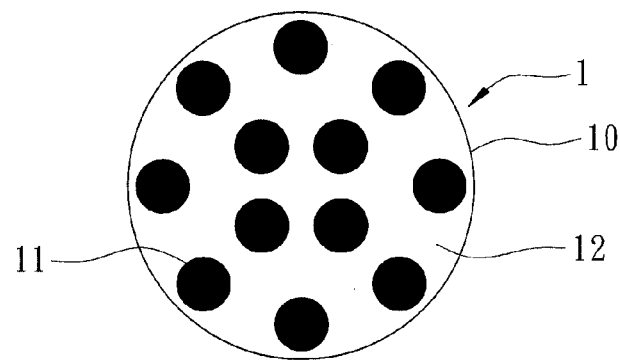

Antistatic composite filaments, each having a cross-section such as that shown in FIG. 4e, were prepared to serve as Sample A1. The antistatic composite filaments were made by simultaneously feeding to a melt spinning extruder conductive and non-conductive matrix materials, which were then extruded through a spinneret. The conductive matrix material included polybutylene terephthalate (PBT) and carbon black dispersed in the PBT. The amount of the carbon black was 15±0.5 wt % based on the total weight of the conductive matrix material. The non-conductive matrix material was polyethylene terephthalate (PET). A volume percentage of the conductive matrix material based on the total volume of the conductive and non-conductive matrix materials is listed in Table 1. In the antistatic composite filaments thus prepared, the conductive matrix material constituted the plurality of conductive matrix portions. Thus, a volume percentage of the conductive matrix portions in each antistatic composite filament based on a total volume of the respective one of the antistatic composite filaments was assumed to be equal to the volume percentage of the conductive matrix material. Similarly, the amount (weight percent) of the carbon black based on the total weight of the conductive matrix portions was assumed to be equal to the amount of the carbon black based on the total weight of the conductive matrix material. A glass transition temperature (Tg) was measured using a TA Q2000 instrument, a breaking strength and a breaking elongation were tested in accordance with the test procedure described in ASTM D2256-2002, and a surface resistivity was tested in accordance with the industrial standard AATCC 76-2005. The results are also shown in Table 1.

Before testing the breaking strength and the breaking elongation, an initial load was measured. The initial load was a load applied to the antistatic composite filaments such that the antistatic composite filaments were substantially straight but the length thereof was substantially not increased due to the initial load. The breaking elongation equals to $(L_{11}-L_{10})/L_{10} \times 100\%$, where $L_{10}$ represents the length of the antistatic composite filaments when the initial load was applied, and $L_{11}$ represents the length of the antistatic composite filaments when the antistatic composite filaments broke.

<Samples A2 to A8>

Each of Samples A2 to A8 was prepared according to the procedure used for preparing Sample A1 except that a volume percentage of the conductive matrix material based on the total volume of the conductive and non-conductive matrix materials was that as listed in Table 1. For each of Samples A2~A8, a breaking strength, a breaking elongation, and a surface resistivity were tested, and the results are also shown in Table 1.

TABLE 1

| Sample | Conductive matrix material* (vol %) | Tg (° C.) | Breaking strength (g/d) | Breaking elongation (%) | Surface resistivity (Ω/square) |
|---|---|---|---|---|---|
| A1 | 70 | 120.25 | 1.7 | 111.92 | $10^2$ |
| A2 | 60 | 118.11 | 2.9 | 121.83 | $10^2$ |
| A3 | 50 | 111.04 | 3.2 | 131.81 | $10^3$ |
| A4 | 40 | 94.83 | 3.8 | 141.74 | $10^3$ |
| A5 | 30 | 83.36 | 3.9 | 151.69 | $10^4$ |
| A6 | 20 | 75.49 | 4.2 | 161.63 | $10^5$ |
| A7 | 15 | 70.13 | 4.3 | 166.66 | $10^6$ |
| A8 | 10 | 65.31 | 4.3 | 171.95 | $10^7$ |

After the antistatic composite filaments are false-twisted for producing an antistatic yarn, the surface resistivity will be $10^3$ times increased, and the breaking strength will be enhanced. An antistatic yarn preferably has a surface resistivity lower than $10^9$ and a breaking strength greater than 3 g/d. Therefore, the antistatic composite filaments preferably have a surface resistivity lower than $10^6$, and a breaking strength greater than 2.5 g/d. Hence, from the results shown in Table 1, the conductive matrix material preferably has a volume percentage of 20% to 60%, i.e., the conductive matrix portions in each of the antistatic composite filaments are preferably present in an amount ranging from 20% to 60% by volume of the respective one of the antistatic composite filaments.

<Samples B1 to B7>

Each of Samples B1~B7 was prepared by following the procedure used for preparing Sample A5, except that the amounts of the carbon black are those as listed in Table 2. For each of Samples B1~B7, a breaking strength, a breaking elongation, and a surface resistivity were tested, and the results are also shown in Table 2.

TABLE 2

| | Sample | | | | | | |
|---|---|---|---|---|---|---|---|
| | B1 | B2 | B3 | B4 | B5 | B6 | B7 |
| Carbon black (wt %) | 9 | 10 | 15 | 20 | 25 | 30 | 35 |
| Surface resistivity (Ω/square) | $8.1 \times 10^6$ | $6.3 \times 10^5$ | $1.2 \times 10^5$ | $3.5 \times 10^4$ | $2.7 \times 10^3$ | $3.1 \times 10^2$ | $2.6 \times 10^2$ |
| Breaking strength (g/d) | 3.68 | 3.41 | 3.38 | 3.31 | 3.12 | 2.85 | 2.31 |
| Breaking elongation (%) | 171.72 | 159.97 | 144.55 | 144.11 | 124.57 | 123.94 | 115.41 |

Because the antistatic composite filaments preferably have a surface resistivity lower than $10^6$ and a breaking strength greater than 2.5 g/d, from the results shown in Table 2, the amount of the carbon black preferably ranges from 10 wt % to 30 wt % based on the weight of the conductive matrix material. That is, the amount of the carbon black in each of the antistatic composite filaments preferably ranges from 10 wt % to 30 wt % based on the weight of the conductive matrix portions in the respective one of the antistatic composite filaments.

<Samples S1 to S4>

Each of Samples S1~S4 was prepared by following the procedure used for preparing Sample A1, except that the amounts of the carbon black and the volume percentages of the conductive matrix material are those shown in Table 3. For each of Samples S1~S4, a breaking strength, a breaking elongation, and a surface resistivity were tested, and the results are also shown in Table 3.

TABLE 3

| Sample | Carbon black (wt %) | Conductive matrix material (vol %) | Surface resistivity (Ω/square) | Breaking strength (g/d) | Breaking elongation (%) |
|---|---|---|---|---|---|
| S1 | 10 | 20 | $7.7 \times 10^5$ | 4.11 | 160.12 |
| S2 | 30 | 20 | $3.5 \times 10^4$ | 3.31 | 144.11 |
| S3 | 10 | 60 | $2.6 \times 10^4$ | 3.39 | 149.01 |
| S4 | 30 | 60 | $2.6 \times 10^2$ | 2.87 | 123.89 |

From the results shown in Table 3, it is noted that when the amount of the carbon black ranges from 10 wt % to 30 wt % based on the weight of the conductive matrix material, and when the conductive matrix material is present in an amount ranging from 20% to 60% by the total volume of the conductive and non-conductive matrix materials, the surface resistivity and the breaking strength fall within the preferable ranges for the antistatic composite filaments.

EXAMPLES 1 TO 6 AND COMPARATIVE EXAMPLES 1 TO 5

The antistatic composite filaments obtained in Sample A5 were used for producing antistatic yarns of Examples 1 to 6 (Ex 1 to Ex 6) and Comparative Examples 1 to 5 (CE 1 to CE 5). Before performing the above-mentioned steps (b) to (e), the surface resistivity of the antistatic composite filaments of each of Ex 1 to 6 and CE 1 to 5 was measured and is listed in Table 4. The above-mentioned steps (b) to (e) were then carried out to form the antistatic composite filaments of Ex 1 to Ex 6 and CE 1 to CE 5 into antistatic yarns. The parameters for producing the antistatic yarns of Ex 1 to Ex 6 and CE 1 to CE 6, such as the first, second and third advancing speeds, the first and second heating temperatures, and the draw ratio of the second advancing speed to the first advancing speed, are also listed in Table 4. For each of the antistatic yarns of Ex 1 to Ex 6 and CE 1 to CE 6, a breaking strength, a breaking elongation, a surface resistivity, and a crimp contraction were tested. The results are also shown in Table 4.

The crimp contraction was tested in accordance with the German standard DIN 53840. In the crimp contraction test, an antistatic yarn to be tested was subjected to a load of 2 cN/tex for 10 seconds to have a length (Lg), and was further subjected to a load of 0.01 cN/tex for 10 minutes to have a length (Lz). The crimp contraction equals to (Lg−Lz)/Lg×100%.

TABLE 4

| | Ex 1 | Ex 2 | Ex 3 | Ex 4 | Ex 5 | Ex 6 |
|---|---|---|---|---|---|---|
| Surface resistivity before step (b) ($\Omega$/square) | $3.2 \times 10^3$ | $3.3 \times 10^3$ | $3.2 \times 10^3$ | $2.7 \times 10^3$ | $2.6 \times 10^3$ | $3.4 \times 10^3$ |
| $1^{st}$ advancing speed (m/min) | 265 | 330 | 230 | 285 | 300 | 260 |
| $1^{st}$ heating temperature (° C.) | 190 | 220 | 180 | 220 | 200 | 200 |
| Draw ratio | 1.5 | 1.5 | 1.75 | 1.75 | 1.5 | 1.75 |
| $2^{nd}$ advancing speed (m/min) | 400 | 500 | 400 | 500 | 450 | 450 |
| $2^{nd}$ heating temperature (° C.) | 180 | 210 | 170 | 210 | 210 | 210 |
| $3^{rd}$ advancing speed (m/min) | 325 | 420 | 325 | 420 | 365 | 365 |
| Breaking strength (g/d) | 3.4 | 3.1 | 3.9 | 4.1 | 3.3 | 3.8 |
| Breaking elongation (%) | 29.5 | 26.5 | 25.5 | 24.5 | 27.5 | 25.5 |
| Surface resistivity after step (e) ($\Omega$/square) | $3.4 \times 10^6$ | $3.7 \times 10^6$ | $4.2 \times 10^6$ | $4.3 \times 10^6$ | $3.3 \times 10^6$ | $3.1 \times 10^6$ |
| Crimp contraction (%) | 35.16 | 36.39 | 38.85 | 39.64 | 36.98 | 39.34 |

| | CE 1 | CE 2 | CE 3 | CE 4 | CE 5 |
|---|---|---|---|---|---|
| Surface resistivity before step (b) ($\Omega$/square) | $2.8 \times 10^3$ | $2.9 \times 10^3$ | $2.8 \times 10^3$ | $3.1 \times 10^3$ | $2.7 \times 10^3$ |
| $1^{st}$ advancing speed (m/min) | 265 | 265 | 340 | 235 | 300 |
| $1^{st}$ heating temperature (° C.) | 150 | 230 | 220 | 200 | 200 |
| Draw ratio | 1.5 | 1.5 | 1.5 | 1.9 | 1.5 |
| $2^{nd}$ advancing speed (m/min) | 400 | 400 | 510 | 450 | 450 |
| $2^{nd}$ heating temperature (° C.) | 140 | 220 | 210 | 210 | 230 |
| $3^{rd}$ advancing speed (m/min) | 325 | 325 | 400 | 360 | 365 |
| Breaking strength (g/d) | 3.3 | 3.1 | 2.9 | 4.1 | 3.2 |
| Breaking elongation (%) | 34.0 | 15.8 | 18.9 | 13.2 | 19.5 |
| Surface resistivity after step (e) ($\Omega$/square) | $3.6 \times 10^6$ | $3.8 \times 10^6$ | $3.7 \times 10^6$ | $4.2 \times 10^6$ | $4.3 \times 10^6$ |
| Crimp contraction (%) | 15.82 | 17.48 | 17.77 | 29.95 | 32.77 |

In Ex 1 to Ex 6, the first and second heating temperatures were controlled at a range of from 160° to 220° C., the first advancing speed was controlled at a range of from 230 m/min to 330 m/min, and the draw ratio was controlled at a range of from 1.5 to 1.75. It can be seen from Table 4 that each of the antistatic yarns obtained in Ex 1 to Ex 6 has a breaking strength greater than 3 g/d, a breaking elongation ranging from 20% to 30%, and a crimp contraction not less than 35%. This means that the antistatic yarns of Ex 1 to Ex 6 are excellent in properties of bulkiness, elasticity and elongation (ductility), and are less likely to break in subsequent texturing processes. Besides, the antistatic yarns of Ex 1 to Ex 6 have a soft hand.

Figure 7:
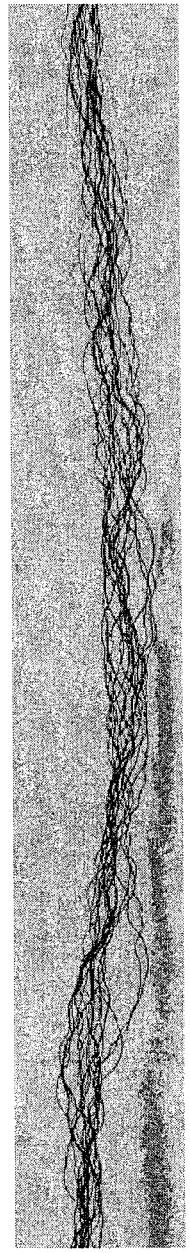
FIGS. 7 and 8 show pictures of antistatic yarns of Example 1 and Comparative Example 1, respectively.
Figure 8:
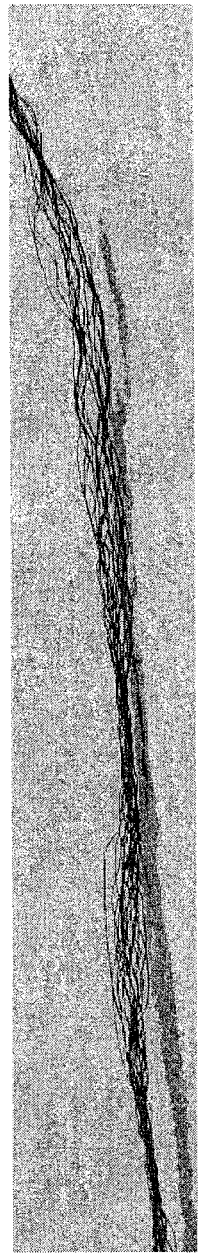

In CE 1, the first and second heating temperatures were lower than 160° C., the crimp contraction is relatively low (15.82%) and the breaking elongation is relatively high (34.0%). The lower crimp contraction means that the antistatic yarn of CE 1 is poor in bulkiness. Furthermore, the antistatic yarn of CE 1 is likely to deform during the subsequent texturing processes due to the higher breaking elongation. FIG. 7 shows a picture of the antistatic yarn of Ex 1, and FIG. 8 shows a picture of the antistatic yarn of CE 1. It can be observed that the antistatic yarn of Ex 1 has a better bulkiness property than that of CE 1.

In CE 2, because the antistatic composite filaments were heated at the first heating temperature of 230° C., which is higher than the melting point of the PBT (about 220.87° C.), the antistatic composite filaments were likely to fusion-bond to one another. This may be the reason why the antistatic yarn of CE 2 has relatively low crimp contraction and breaking elongation. Thus, the antistatic yarn of CE 2 is poor in properties of bulkiness and elongation. Besides, the antistatic yarn of CE 2 also has a hard hand.

In CE 3, although the draw ratio was controlled at 1.5 and the first and second heating temperatures were controlled within the preferable ranges, the antistatic yarn is still poor in properties of bulkiness and elongation. This may be because the first advancing speed was too high (higher than 330 m/min), so that the antistatic composite filaments were not softened enough to permit deformation thereof during the false twisting process. On the other hand, if the first advancing speed is too low (lower than 230 m/min), the antistatic composite filaments are likely to fusion-bond to one another. Thus, the first advancing speed preferably ranges from 230 m/min to 330 m/min.

In CE 4, although the first and second heating temperatures and the first and second advancing speeds were controlled within the preferable ranges, the breaking elongation of the antistatic yarn was relatively low (13.2%). Besides, the antistatic yarn obtained in CE 4 was a broken filament yarn which is likely to break in the subsequent texturing processes. This is because the draw ratio in CE 4 was unduly large (1.9).

The antistatic yarn of CE 5 was produced by following the procedures for producing the antistatic yarn of Ex 5 except that the second heating temperature was higher than the melting point of the PBT. It can be found that the antistatic yarn of CE 5 has relatively low breaking elongation and crimp contraction. On the other hand, if the second heating temperature is too low (lower than 150° C.), the antistatic yarn may at least be partially restored to its original structure when subjected to heating in a subsequent dyeing process.

EXAMPLES 7 TO 10 AND COMPARATIVE EXAMPLE 6

Antistatic composite filaments were prepared for producing antistatic yarns of Examples 7 to 10 (Ex 7 to Ex 10) and Comparative Examples 6 (CE 6). In each of Ex 7 to Ex 10 and CE 6, the antistatic composite filaments were prepared following the procedure used for preparing Sample A1, except that the amount of the carbon black and the volume percentage of the conductive matrix material are those as shown in Table 5. A surface resistivity of the antistatic composite filaments of each of Ex 7 to Ex 10 and CE 6 was tested and is listed in Table 5. The antistatic composite filaments of each of Ex 7 to Ex 10 was then subjected to the above-mentioned steps (b) to (e) according to the parameters used for producing the antistatic yarn of Ex 5 to thereby obtain antistatic yarns of Ex 7 to Ex 10 and CE 6. A surface resistivity for each of the antistatic yarns was tested and is also listed in Table 5.

TABLE 5

|  | Ex 7 | Ex 8 | Ex 9 | Ex 10 | CE 6 |
|---|---|---|---|---|---|
| Carbon black (wt %) | 10 | 15 | 20 | 25 | 9 |
| Conductive matrix material (vol %) | 60 | 60 | 45 | 40 | 60 |
| Surface resistivity before step (b) (Ω/ square) | $6.3 \times 10^5$ | $3.5 \times 10^4$ | $2.7 \times 10^3$ | $2.6 \times 10^2$ | $8.1 \times 10^6$ |
| Surface resistivity after step (e) (Ω/ square) | $2.2 \times 10^8$ | $4.1 \times 10^7$ | $3.3 \times 10^6$ | $3.6 \times 10^5$ | $6.5 \times 10^9$ |

From the results shown in Table 5, it can be found that when the amount of the carbon black is lower than 10 wt % (CE 6), the surface resistivity of the antistatic yarn is higher than $10^9$. This means that the antistatic yarn of CE 6 has a poor antistatic property. Besides, in order to provide an antistatic yarn with an excellent strength and antistatic property, the amount of the carbon black preferably ranges from 10 wt % to 30 wt %.

Figure 2:
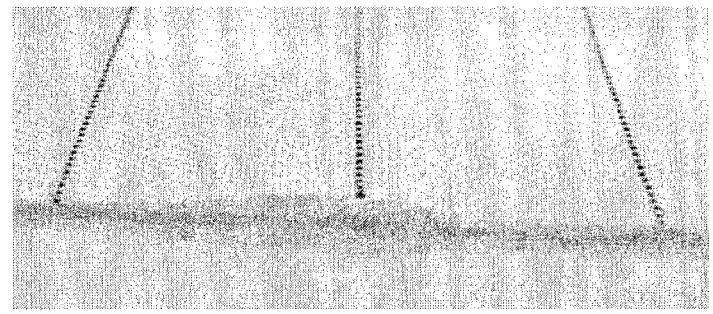
Figure 9:
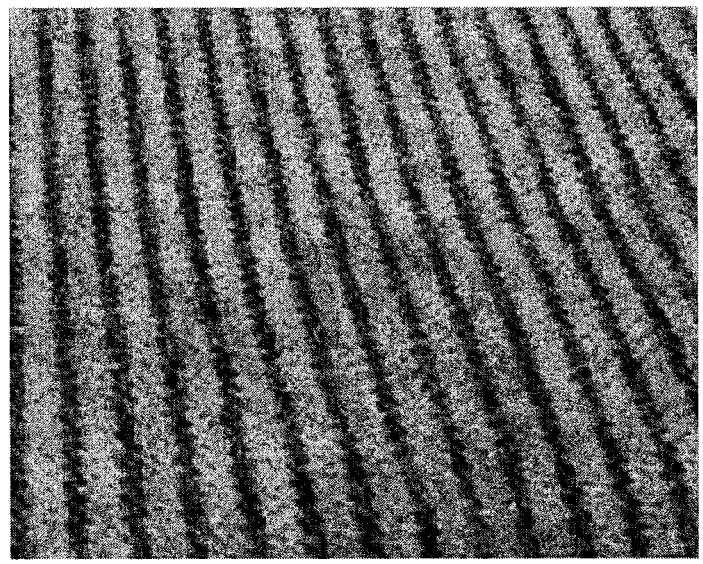
FIGS. 9 and 10 show a fabric produced from an antistatic yarn made according to the process of this invention.
Figure 10:

FIGS. 9 and 10 show a fabric produced from the antistatic yarn of this invention. It can be well-observed from a comparison between the fabric of FIGS. 9 and 10 and the fabric of FIGS. 1 and 2 that the fabric made from the antistatic yarn of the present invention has a better bulkiness property. Besides, the fabric shown in FIGS. 9 and 10 has a softer hand than that shown in FIGS. 1 and 2.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A process for producing an antistatic yarn, comprising the steps of:
    (a) providing antistatic composite filaments, each extending in an axial direction and including a conductive matrix portion that is made of a first synthetic polymer material having carbon black dispersed therein, and a non-conductive matrix portion that is made of a second synthetic polymer material, each of the conductive and non-conductive matrix portions extending in the axial direction;
    (b) advancing the antistatic composite filaments to a first heating zone having a first heating temperature (T) at a first advancing speed which ranges from 230 m/min to 330 m/min, such that Tm−T≤60° C. where Tm is a melting point of the first synthetic polymer material;
    (c) drawing the antistatic composite filaments from the first heating zone to a false twist zone at a second advancing speed such that a draw ratio which is a ratio of the second advancing speed to the first advancing speed ranges from 1.5 to 1.75, thereby obtaining false twisted filaments; and
    (d) advancing the false twisted filaments from the false twist zone to a second heating zone for heat-setting so as to obtain a crimped yarn.

2. The process of claim 1, wherein the amount of the carbon black ranges from 10 wt % to 30 wt % based on the weight of the conductive matrix portion.

3. The process of claim 1, wherein the conductive matrix portion is present in an amount ranging from 20% to 60% by volume of the antistatic composite filament.

4. The process of claim 1, wherein the first synthetic polymer material is selected from the group consisting of polybutylene terephthalate, polytrimethylene terephthalate, polyethylene, polypropylene, polyvinyl chloride, poly(vinylidene dichloride), and polyacrylonitrile.

5. The process of claim 1, wherein the second synthetic polymer material is selected from the group consisting of polyester, polyamide, and polyolefin.

6. The process of claim 1, wherein the first heating temperature ranges from 160° C. to 220° C.

7. The process of claim 6, wherein the second heating zone has a second heating temperature ranging from 150° C. to 210° C.

8. The process of claim 1, further comprising a step of advancing the crimped yarn to a take-up roller at a third advancing speed such that a draw ratio which is a ratio of the third advancing speed to the second advancing speed is about 0.8.

9. The process of claim 1, wherein the crimped yarn has a breaking strength greater than 3 g/d, a breaking elongation ranging from 20% to 30%, and a crimp contraction not less than 35%.

10. The method of claim 1, wherein the second advancing speed ranges from 400 m/min to 500 m/min.

11. The method of claim 1, wherein the antistatic composite filament has an outer peripheral surface and includes a plurality of the non-conductive matrix portions, and a plurality of the conductive matrix portions, at least one of which is disposed adjacent to the outer peripheral surface.

12. The method of claim 11, wherein the non-conductive matrix portions are evenly distributed among the conductive matrix portions.

* * * * *